(12) United States Patent
Kawamoto

(10) Patent No.: US 9,622,501 B2
(45) Date of Patent: Apr. 18, 2017

(54) LIQUID SEASONING

(71) Applicant: HANAMARUKI FOODS INC., Nagano (JP)

(72) Inventor: Ikuo Kawamoto, Kumagaya (JP)

(73) Assignee: HANAMARUKI FOODS INC., Nagano-Ken (JP)

( * ) Notice: Subject to any disclaimer, the term of this patent is extended or adjusted under 35 U.S.C. 154(b) by 15 days.

(21) Appl. No.: 14/425,911

(22) PCT Filed: Sep. 6, 2013

(86) PCT No.: PCT/JP2013/074018
§ 371 (c)(1),
(2) Date: Mar. 4, 2015

(87) PCT Pub. No.: WO2014/038649
PCT Pub. Date: Mar. 13, 2014

(65) Prior Publication Data
US 2015/0289547 A1    Oct. 15, 2015

(30) Foreign Application Priority Data

Sep. 7, 2012  (JP) ................................. 2012-197223

(51) Int. Cl.
| | | |
|---|---|---|
| *A23L 1/221* | (2006.01) | |
| *A23L 1/22* | (2006.01) | |
| *A23L 1/105* | (2006.01) | |
| *A23L 7/104* | (2016.01) | |
| *A23L 27/10* | (2016.01) | |
| *A23L 27/24* | (2016.01) | |

(52) U.S. Cl.
CPC ............... *A23L 1/221* (2013.01); *A23L 7/104* (2016.08); *A23L 27/10* (2016.08); *A23L 27/24* (2016.08); *A23V 2002/00* (2013.01)

(58) Field of Classification Search
CPC ....... A23L 1/221; A23L 1/105; A23L 1/22091
USPC .......................................................... 426/64
See application file for complete search history.

(56) References Cited

U.S. PATENT DOCUMENTS

2005/0220937 A1    10/2005    Ito et al.

FOREIGN PATENT DOCUMENTS

| CN | 1839710 | 10/2006 |
|---|---|---|
| JP | 11-299458 | 11/1999 |
| JP | 2004-267057 | 9/2004 |
| JP | 2007-105020 | 4/2007 |
| JP | 5039964 | 7/2012 |

OTHER PUBLICATIONS

Arima, H. et al. JP 56-015-670 A. 1981. English Abstract.*
International Search Report issued Oct. 1, 2013 in International Application No. PCT/JP2013/074018.
Edited by "Nippon no Shokuseikatsu Zenshu Toyama" Henshu Iinkai, Nippon no Shokuseikatsu Zenshu 16 Kikisho Toyama no Shokuji, Shadan Hojin Nosan Gyoson Bunka Kyokai, Oct. 25, 1989 (with partial English translation).
Japanese Office Action dated Jun. 24, 2016, issued in corresponding Japanese Patent Application No. 2012-197223 (with English translation).
Chinese Office Action dated Dec. 23, 2015, issued in corresponding Chinese Patent Application No. 201380057947.X (with English translation).
Japanese Office Action dated Sep. 9, 2016 issued in Japanese Patent Application No. 2012-197223 (with English translation).
Chinese Office Action dated Sep. 12, 2016 issued in Chinese Patent Application No. 201380057947.X (with English translation).

* cited by examiner

*Primary Examiner* — Hamid R Badr
(74) *Attorney, Agent, or Firm* — Wenderoth, Lind & Ponack, L.L.P.

(57) ABSTRACT

The present invention relates to a novel liquid seasoning and a method for producing the liquid seasoning. According to the present invention, it is possible to provide a novel liquid seasoning that retains the function of salted rice malt, has a good balance among umami, sweetness and saltiness, has a less koji smell and is highly convenient, and to provide a method for producing the liquid seasoning.

10 Claims, 2 Drawing Sheets

LIQUID SEASONING

CROSS-REFERENCE TO RELATED APPLICATION

The present patent application is based on an earlier Japanese patent application, which is Japanese Patent Application No. 2012-197223 (application date: Sep. 7, 2012). The present patent application claims priority to Japanese Patent Application No. 2012-197223. The entire contents of Japanese Patent Application No. 2012-197223 are incorporated herein by reference.

BACKGROUND OF THE INVENTION

Technical Field

The present invention relates to a novel liquid seasoning and a method for producing the novel liquid seasoning.

Technical Background

Malted rice (kome-koji) is used as a traditional raw material that produces complicated, preferable flavor for the production of alcoholic drinks, such as sake, shochu, and sweet sake (mirin), and for the production of brewing seasonings. The sweet sake is known as a seasoning whose main raw material is malted rice, and the sweet sake is used as seasoning that adds strong sweetness.

Recently, salted rice malt (shio-koji) is attracting attention. The salted rice malt is a seasoning in which malted rice, salt and water are mixed, fermented, and matured. The taste of the salted rice malt is complex taste in which umami, sweetness, and saltiness are mixed with good balance. The salted rice malt is referred to as all-purpose seasoning. In addition, the salted rice malt contains enzymes. It is said that using the salted rice malt for pickling foods, such as vegetable, meat and fish, brings out the taste of the foods. Japanese Patent No. 5039964 (patent document 1) discloses powder-type salted rice malt that is obtained by drying and crushing salted rice malt.

Japanese Patent Laid-open Publication No. 2004-267057 (patent document 2) discloses a seasoning having a meat-quality improving effect, characterized in that moromi mixed with cereal koji prepared by using raw materials whose total nitrogen is adjusted to 3.0 weight % or more and salt water is matured for 0.5 to 2.0 months at a low temperature, followed by solid-liquid separation. However, this document refers only to so called "soy sauce koji" that is koji made from soybeans and wheat, and the malted rice is excluded from the cereal koji. Further, the taste of this seasoning mainly comes from umami and saltiness, and is thought to have less sweetness.

PRIOR ART DOCUMENTS

Patent Literatures

Patent document 1: Japanese Patent Application Publication No. 5039964
Patent document 2: Japanese Patent Laid-Open Publication No. 2004-267057

SUMMARY OF INVENTION

As described above, to the knowledge of the inventors, there have been no liquid seasonings that have the function specific to the salted rice malt, in which tastes of umami, sweetness, and saltiness are well-balanced.

The inventors have found that, when a preparation liquid in which malted rice, salt, and water are mixed is subjected to fermentation and maturation at a low temperature and then subjected to solid-liquid separation, a novel liquid seasoning is obtained which retains the function of the salted rice malt and tastes of umami, sweetness, and saltiness are well-balanced. In addition, the inventors have found that this liquid seasoning has less koji-specific flavor, represented by "koji smell", "chestnuts odor", or "mushroom odor", than the salted rice malt. Further, the inventors have found that using this liquid seasoning in cooking induces faster infiltration of taste than using the salted rice malt, and have found that this liquid seasoning has greater convenience for seasonings than the salted rice malt. The present invention is based on the above-described findings.

Thus, an object of the present invention is to provide a novel liquid seasoning which retains the function of the salted rice malt, has a good balance among umami, sweetness and saltiness, less koji smell and greater convenience, and to provide a method for producing the novel liquid seasoning.

According to an embodiment of the present invention, the liquid seasoning of the present invention is obtained by preforming fermentation and maturation at a low temperature of a preparation liquid prepared by mixing malted rice, salt and water and then carrying out a solid-liquid separation.

According to a preferable embodiment of the present invention, the liquid seasoning is obtained by performing the fermentation and maturation under a condition of 4° C. to 40° C.

According to a preferable embodiment of the present invention, the liquid seasoning is obtained by performing the fermentation and maturation until the Brix value increases by 4% or more relative to (based on) the Brix value in the first day of the fermentation and maturation.

According to a preferable embodiment of the present invention, the liquid seasoning is obtained by performing the fermentation and maturation until the concentration of direct sugar increases by 8% or more relative to the concentration of direct sugar in the first day of the fermentation and maturation.

According to a preferable embodiment of the present invention, the period of the fermentation and maturation of the liquid seasoning is 1 to 60 days.

According to a preferable embodiment of the present invention, the liquid seasoning has enzyme activity.

According to a more preferable embodiment of the present invention, the enzyme of the liquid seasoning is a protease.

According to an embodiment of the present invention, a method for producing the liquid seasoning of the present invention comprises performing fermentation and maturation at a low temperature of a preparation liquid prepared by mixing malted rice, salt and water, and then subsequently carrying out a solid-liquid separation.

According to a preferable embodiment of the present invention, the production method includes performing fermentation and maturation of the preparation liquid under a condition of 4° C. to 40° C.

According to an embodiment of the present invention, a food and drink of the present invention is prepared by adding the liquid seasoning of the present invention.

According to the present invention, it is possible to provide a novel liquid seasoning that retains the function of salted rice malt and has a good balance among umami, sweetness and saltiness, and to provide a method for producing the novel liquid seasoning. In addition, the liquid seasoning of the present invention has less koji smell, and thus can be used by consumers who dislike the salted rice malt because of the koji smell. Further, the seasoning of the present invention is highly convenient because consumers do not need using their hands or a spatula in order to use the seasoning of the present invention for cooking, unlike in the case of a rice-gruel-like or pasty salted rice malt for cooking.

DETAILED DESCRIPTION OF THE INVENTION

Liquid Seasoning/Production Method of Liquid Seasoning

Figure 1:
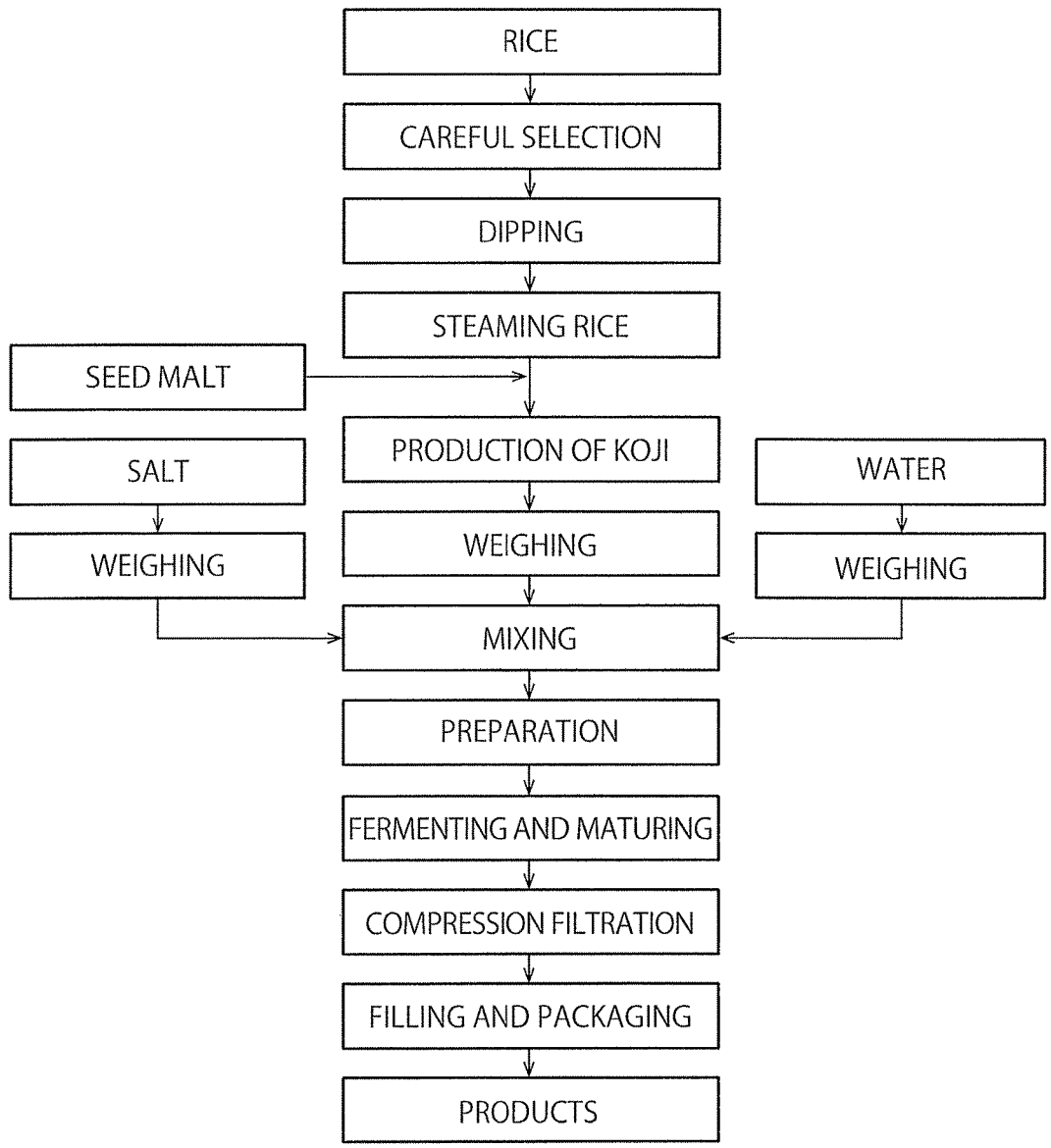
FIG. 1 illustrates an example of a production flow of the present invention.

The liquid seasoning of the present invention is obtained by performing fermentation and maturation at a low temperature of the preparation liquid prepared by mixing malted rice, salt and water, and subsequently carrying out a solid-liquid separation. In other words, the method for producing the liquid seasoning of the present invention comprises performing fermentation and maturation at a low temperature of a preparation liquid prepared by mixing malted rice, salt and water, and subsequently carrying out a solid-liquid separation.

The malted rice used in the present invention may be prepared in accordance with a usual koji production method for producing malted rice. Specifically, the malted rice is obtained by spraying koji-mold (also referred to as seed malt) on steamed rice prepared by steaming rice, and then breeding the koji-mold under the condition optimal to the koji-mold. For breeding the koji-mold, an automatic fermentation machine (for example, HK-60, produced by Yaegaki Food & System, Inc.) may be used to perform cultivation for 2 to 4 days at 25° C. to 40° C. The malted rice used in the present invention may be a commercial product.

Rice, such as nonglutinous rice, glutinous rice and brewer's rice, preferably polished rice (white rice), may be washed as necessary, soaked in water and drained as necessary.

The koji-mold is not limited in particular insofar as it is used for a normal production of koji. A preferable example is genus aspergillus (*Aspergillus*), such as *Aspergillus oryzae* and *Asperugillus sojae*. The koji-mold used in the present invention may be a commercial product sold as seed malt or may be a cultured mold. In addition, the koji-mold may be granular or powdery. The koji-mold used in the present invention preferably has high saccharification power or high productibility of protease. Specifically, the koji-mold used in the present invention may be koji-mold used for miso, koji-mold used for malted rice, or koji-mold used for soy sauce. More preferably, it is the koji-mold used for malted rice or the koji-mold used for miso. It is further more preferably the koji-mold used for miso. One kind of koji-mold among these koji-molds may be used singly, or two or more kinds of koji-molds may be used in combination.

The preparation liquid of the present invention is obtained by mixing malted rice, salt and water. These may be simultaneously put in and mixed, or may be successively put in and mixed.

The malted rice is mixed desirably to have 30 to 70 weight % relative to the preparation liquid, preferably 35 to 60 weight %, more preferably 40 to 55 weight %, and further more preferably 45 to 50 weight %.

The salt is mixed to desirably have 8 to 20 weight % relative to the preparation liquid, preferably 10 to 16 weight %, more preferably 12 to 15 weight %, and further more preferably 13 to 14 weight %. This salt can inhibit or reduce growth of microorganisms in the preparation liquid.

The phrase "preforming fermentation and maturation at a low temperature of a preparation liquid" in the present invention means that the preparation liquid is subjected to the fermentation and maturation at a temperature at which enzymes derived from koji-mold and contained in the preparation liquid are not inactivated (deactivated). Here, the enzymes derived from the koji-mold refer to enzymes produced by the koji-mold, and includes, for example, amylase, protease, lipase and cellulase. These enzymes are weak against heat. In particular, protease is inactivated when the fermentation and maturation are performed at 60° C. or more (see Example 5 in the embodiment).

According to a preferable embodiment of the present invention, it is desirable that the low temperature is 4° C. to 40° C., preferably 20° C. to 38° C., more preferably 25° C. to 35° C., and further more preferably 28° C. to 32° C. The enzymes derived from the koji-mold are not inactivated at these temperature.

In the present invention, the "fermentation and maturation" means not only that fermentation is performed by the koji-mold but also that starch, proteins and lipids contained in rice are decomposed by the enzymes derived from the koji-mold. This may be mainly referred to as saccharification. It is noted that the preparation liquid after performing the fermentation and maturation (i.e., matured product) may be referred to as "salted rice malt (shio-koji, shiokoji, shio koji)".

According to a preferable embodiment of the present invention, it is desirable to perform fermentation and maturation to an extent until the Brix value (value of Brix) of the preparation liquid after performing the fermentation and maturation (i.e., matured product) is increased by 4% or more relative to the Brix value in the first day of the fermentation and maturation, preferably until by 6% or more, and further more preferably until by 9% or more. Here, the Brix value in the first day of the fermentation and maturation means a Brix value of the preparation liquid before onset of fermentation and maturation. That is, it is a Brix value of the preparation liquid itself obtained by mixing malted rice, salt and water. In addition, the Brix means a value measured using a refractometer. The value of Brix varies in accordance with the increase and decrease of sucrose, salt, various amino acids, glucose, maltose, and other components. Thus, the Brix value varies in accordance with the composition of raw materials of the preparation liquid. For example, when the preparation liquid is obtained by mixing 50 weight % of malted rice, 13 weight % of salt and 37 weight % of water, it is desirable to perform the fermentation and maturation to an extent until the Brix value of the preparation liquid after performing the fermentation and maturation (i.e., matured product) becomes 37% or more, preferably until 39% or more, and further more preferably until 41% or more. The Brix can be measured by one of ordinary skill in the art using a known method. For example, the Brix can be measured using a commercial hand-held refractometer or a commercial digital refractometer. Generally, measuring the Brix is simpler than measuring the concentration of direct sugar.

In addition, according to a preferable embodiment of the present invention, it is desirable to perform the fermentation and maturation to an extent until the concentration of direct sugar of the preparation liquid after performing the fermentation and maturation (i.e., matured product) is increased by 8% or more relative to the concentration of direct sugar in the first day of the fermentation and maturation, preferably until by 12% or more, and further more preferably until by 18% or more. Here, the direct sugar means direct reducing sugar, and the concentration of direct sugar varies in accordance with the composition of raw materials of the preparation liquid. For example, when the preparation liquid is obtained by mixing 50 weight % of malted rice, 13 weight % of salt and 37 weight % of water, it is desirable to perform the fermentation and maturation to an extent until the concentration of direct sugar of the preparation liquid after performing the fermentation and maturation (i.e., matured product) becomes 16% or more, preferably until 20% or more, and further more preferably until 26% or more. The concentration of direct sugar can be measured by one of ordinary skill in the art using a known method. For example, the concentration of direct sugar can be measured using Somogyi modification method (Nippon Nogeikagaku Kaishi 28(3) 171-174 (1954)) or a method shown by Japan Agricultural Standards for soy-source.

According to a more preferable embodiment of the present invention, it is desirable to perform the fermentation and maturation to an extent until the Brix of the preparation liquid after performing the fermentation and maturation (i.e., matured product) is increased by 4% or more relative to the Brix in the first day of the fermentation and maturation and the concentration of direct sugar is increased by 8% or more relative to the concentration of direct sugar in the first day of the fermentation and maturation, preferably until the Brix is increased by 6% or more and the concentration of direct sugar is increased by 12% or more, and further more preferably until the Brix is increased by 9% or more and the concentration of direct sugar is increased by 18% or more. When the Brix of the preparation liquid after performing the fermentation and maturation (i.e., matured product) is increased by 4% or more and the concentration of direct sugar of the preparation liquid after performing the fermentation and maturation (matured product) is increased by 8% or more relative to the respective values in the first day of the fermentation and maturation, the balance among umami, sweetness, and saltiness becomes superior.

According to an embodiment of the present invention, when the preparation liquid is obtained by mixing 50 weight % of malted rice, 13 weight % of salt and 37 weight % of water, it is preferable to perform the fermentation and maturation to an extent until the Brix of the preparation liquid after performing the fermentation and maturation (matured product) becomes 37% or more and the concentration of direct sugar of the preparation liquid after performing the fermentation and maturation (matured product) becomes 16% or more, further preferably until the Brix becomes 39% or more and the concentration of direct sugar becomes 20% or more, and further more preferably until Brix becomes 41% or more and the concentration of direct sugar becomes 26% or more.

According to a preferable embodiment of the present invention, it is desirable to perform the fermentation and maturation at a low temperature for 1 to 60 days, preferably for 2 to 30 days, further preferably for 3 to 21 days, further more preferably for 4 to 14 days, highly preferably for 6 to 13 days, particularly preferably for 8 to 12 days, and especially preferably for 10 days. As the temperature is lower, the activity of enzymes derived from koji-mold becomes lower and thus the period of the fermentation and maturation becomes longer. Thus, according to a further preferable embodiment of the present invention, when the temperature of fermentation and maturation is in the range of 20° C. to 38° C., it is desirable to perform the fermentation and maturation for 3 to 21 days, preferably for 4 to 14 days, further preferably for 6 to 13 days, furthermore preferably for 8 to 12 days, and most preferably for 10 days.

According to a further preferable embodiment of the present invention, the fermentation and maturation is performed at 20° C. to 38° C. for 3 to 21 days to an extent until the Brix of the preparation liquid after performing the fermentation and maturation (i.e., matured product) is increased by 4% or more and the concentration of direct sugar is increased by 8% or more, relative to the respective values in the first day of the fermentation and maturation.

Thus, according to an embodiment of the present invention, the liquid seasoning of the present invention is obtained by carrying out the solid-liquid separation from the preparation liquid after performing the fermentation and maturation at a low temperature (i.e., matured product) wherein the fermentation and maturation are performed until the Brix and/or the concentration of direct sugar respectively become predetermined values, and/or wherein the fermentation and maturation are performed for a predetermined period.

In the present invention, the "solid-liquid separation" means a method for separating solid matter from liquid. The solid-liquid separation method is not particularly limited, and may be a method normally used for sweet sake or soy sauce. For example, compression filtration using a compression filtration apparatus, compression using a filter cloth, solid-liquid separation using a centrifugal separation apparatus may be used. The compression filtration is preferable.

The filtrate obtained by the solid-liquid separation can be directly used as the liquid seasoning of the present invention.

The thus-obtained liquid seasoning has activity of enzymes derived from koji-mold, and the activity is equal to or higher than that of enzymes of the matured product before carrying out the solid-liquid separation. Thus, according to an embodiment of the present invention, the liquid seasoning of the present invention has the enzyme activity, and preferably has the protease activity.

In addition, the thus-obtained liquid seasoning has koji smell less than the koji smell of the matured product before carrying out the solid-liquid separation (see Examples 1 and 2 in the embodiment described below), and has sweet smell associated with honey.

Further, the concentration of direct sugar of the thus-obtained liquid seasoning is similar to the concentration of the matured product before carrying out the solid-liquid separation. Thus, it is preferable that the concentration of direct sugar of the liquid seasoning of the present invention is 16% or more, further preferably 20% or more, and further more preferably 26% or more.

A product prepared by further diluting the filtrate obtained by carrying out the solid-liquid separation may be used as the liquid seasoning of the present invention. Here, it is preferable to perform the dilution so as to obtain a desired salt concentration.

A product prepared by further sterilizing the filtrate obtained by carrying out the solid-liquid separation may be used as the liquid seasoning of the present invention. The sterilization method is not particularly limited insofar as the method is used usually for sterilizing liquid. For example, heat sterilization, sterilization by ethanol (spirit) addition, filter sterilization, or the like may be used. The sterilization by ethanol addition or the filter sterilization is preferable as the sterilization method because neither of them inactivate the enzymes of the liquid seasoning obtained.

In the sterilization by ethanol addition, the amount of added ethanol is not particularly limited insofar as the amount leads to sterilization of the liquid seasoning. Relative to the liquid seasoning, ethanol is added preferably to reach 0.5 to 10 weight %, more preferably 1 to 6 weight %, and further more preferably 2 to 5 weight %. When the concentration of added ethanol reaches 10 weight % or more, alcohol smell and alcohol taste become conspicuous.

The sterilization by the filter sterilization can be performed, for example, by filtration using diatomaceous earth or by filtration using a microporous membrane. This filtration can reduce or eliminate microorganisms from liquid.

The filtrate obtained by the solid-liquid separation may be further subjected to concentration or decolorization using filtration membrane, resin or the like to obtain the liquid seasoning of the present invention.

In addition, the liquid seasoning of the present invention may contain other components, such as preservative, antioxidant and spice. Here, in order to avoid inactivation of the enzymes, it is preferable that pH of other components in the aqueous solution is in a neutral range.

According to an embodiment of the present invention, a food and drink is provided in which the liquid seasoning of the present invention is added. Here, the food and drink is not particularly limited insofar as the food and drink is normally subjected to addition of salted rice malt, sweet sake, and soy sauce. It is noted that the liquid seasoning of the present invention infiltrates into foods faster than the salted rice malt. Thus, it is possible in a short time to soften meats, to increase the taste of foods, or to impart the good balance among umami, sweetness, and saltiness of the liquid seasoning. Traditionally, the salted rice malt has a rice-gruel-like form or a pasty form in which rice grains are battered and thickened. Thus, when the salted rice malt is used for foods, it is necessary to apply or rub the salted rice malt to the foods by hands or a spatula. In contrast, the liquid seasoning of the present invention is in a liquid form, and thus has a good usability and great convenience. Further, the liquid seasoning of the present invention can be used even to some kinds of foods for which use of the salted rice malt has been avoided because grains of koji contained in the salted rice malt have spoiled the appearance (see Example 3 in the embodiment described later).

The food and drink includes, for example, other seasonings such as miso, soy sauce, sweet sake, mayonnaise, dressing, and ponzu vinegar; tsuyu such as soup of noodle, soup of oden, and soup of hot pot; tare sauce such as sauce for broiled (grilled, barbecued) meat; soaking solution for meat, fish and vegetable; sauce such as meat sauce, and white sauce; soup; soup stock; confection and bread; and the like.

In addition, the food and drink includes cooked foods such as broiled meat and fish in which meat of livestock and fish treated with the seasoning of the present invention are used, boiled dish, curry, stew, miso soup, spaghetti, hamburg steak, and dumpling; and processed foods such as kimchi, pickles, kamaboko, sausage, frozen food, ready-made food, and chilled food.

The amount of the liquid seasoning of the present invention added to the food and drink, to the meat of livestock, and to the fish is individually and appropriately selected in accordance with the target food and drink.

EXAMPLES

Although the present invention will be described in detail by referring to Examples described below, the present invention is not limited to these Examples.

Example 1

Method for Producing Liquid Seasoning

The liquid seasoning was produced in accordance with steps illustrated in FIG. 1.
(1) Preparation of Malted Rice Rice was soaked for 12 hours in water having the amount 1.2 times the amount of the rice, and was drained for 2 hours. Then, the drained rice was steamed for 45 minutes using a steamer (produced by Hanyuda Co. Ltd.) and the steamed rice was obtained. After the steamed rice was cooled to the temperature of 30° C., seed malt (seed malt to be used for miso, obtained from Higuchi Matsunosuke Shoten Co. Ltd.) was scattered and mixed several times (tanekiri) so that the seed malt relative to 1 kg of the steamed rice was 0.3 g (steamed rice:seed malt=1000:0.3). While being stirred occasionally, the rice mixed with the seed malt was cultivated for 42 hours at 35° C. by an automatic fermentation machine (HK-60, produced by Yaegaki Food & System, Inc.) and thus malted rice was obtained.
(2) Preparation of Liquid Seasoning A preparation liquid was obtained by mixing 50 kg of malted rice obtained, 13 kg of salt (crude salt) and 37 L of water. The preparation liquid was subjected to fermentation and maturation for 10 days at 30° C. and a matured product was obtained (Comparison block 1). The matured product obtained was subjected to compression filtration using a compression filtration apparatus (pressure-filtration compression apparatus used for laboratory, produced by NSK Engineering Co., Ltd.), and the filtrate was obtained as a liquid seasoning (test block 1).
(3) Analysis of Liquid Seasoning Sensory evaluation was carried out for the matured product obtained (comparison block 1) and the liquid seasoning (test block 1) by measuring pH, direct sugar, salt, and enzyme activity.

The pH measurement was performed using a pH meter (F-72, produced by Horiba, Ltd).

The direct sugar measurement was performed by Somogyi modification (Nippon Nogeikagaku Kaishi 28 (3) 171-174 (1954)).

The salt measurement was performed using a potential-difference titration device (AT-500N, produced by Kyoto Electronics Manufacturing Co., Ltd.).

The enzyme activity measurement was performed in terms of the protease activity at pH 6.0, which was measured by Kageyama modification of phenol reagent method of Folin-Ciocalteu (Hakkokogaku Zasshi 33 (1) 28-32 (1955)). Specifically, the following method was used. Each of 5 g samples (matured product, liquid seasoning) was subjected to 10 fold dilution using 0.5% NaCl solution and filtration. Then, 1 mL of the filtrate (sample solution) was further diluted using 4 mL of phosphate buffer at pH 6.0. A 2-mL aliquot of a solution prepared by adding phosphate buffer at pH 6.0 to milk casein to make a concentration of 1.5% was added as a substrate to 1 mL of the diluted solution obtained (test liquid), and the resultant mixture was reacted for 1 hour at 37° C. Then, 4 mL of 0.4 mol/L trichloroacetic acid was added to stop the reaction. The solution obtained was filtered. To 1 mL of the filtrate, 5 mL of 0.4 mol/L sodium carbonate was added, and 1 mL of a phenol reagent was further added. Then, the resultant mixture was allowed to develop color for 20 minutes at 37° C. The colored solution was used as a test sample. Note that a control (blank sample) was prepared in the following way. First, 4 mL of 0.4 mol/L trichloroacetic acid was added to 2 mL of the substrate in advance, 1 mL of the test liquid was added thereto, and the resultant mixture was reacted for 1 hour at 37° C. Then, the reaction mixture was filtered and the firtrate was used for color development. The absorbance of the test sample and the blank sample at the wavelength of 660 nm was measured using a spectrophotometer (UV-1200, Shimadzu Corporation). The absorbance of the blank sample was subtracted from the absorbance of the test sample, and the result was multiplied by the dilution ratio and the factor (coefficient) of the phenol reagent to obtain the protease activity (unit/g) for 1 g of the sample (specifically, protease activity (unit/g)= [absorbance of the test sample−absorbance of the blank sample]×350 (the dilution ratio)×factor of the phenol reagent). Here, the factor of the phenol reagent was calculated using a tyrosine solution. Specifically, the absorbance was measured under the same conditions as above except that 1 mL of 50 μg/mL tyrosine solution was used instead of the above-described solution. The factor of the phenol reagent was obtained by dividing the standard absorbance of the tyrosine solution of 0.350 by the measured absorbance. (Specifically, the factor of phenol reagent=0.350/absorbance of 50 μg/mL tyrosine solution for each preparation of the phenol reagent).

The sensory evaluation was carried out by 5 trained, specialized panelists. Items of "odor" and "taste" of the matured product (comparison block 1) and the liquid seasoning (test block 1) were evaluated as described below and the average values are shown. In addition, sensory findings are also shown.

(Sensory Evaluation Criteria)

The "odor" was evaluated using the following evaluation criteria.

5: Good. No offensive smell (koji-specific smell (that is, koji smell), smell produced by heating, stuffy smell) is felt. Sweet smell is strongly felt.

4: Slightly good. No offensive smell is felt. Sweet smell is felt.

3: Normal. No offensive smell is felt.

2: Slightly bad. A little offensive smell is felt.

1: Bad. Offensive smell is felt.

The "taste" was evaluated using the following evaluation criteria.

5: Good. No foreign taste (unpleasant taste) is felt. The balance among umami, sweetness and saltiness is very good.

4: Slightly good. No foreign taste is felt. The balance among umami, sweetness and saltiness is slightly good.

3: Normal. No foreign taste is felt. The balance among umami, sweetness and saltiness is good.

2: Slightly bad. A little foreign taste is felt. A little bitter taste is felt in umami, sweetness and saltiness.

1: Bad. Foreign taste is felt. Bitter taste is felt in umami, sweetness and saltiness.

Results are shown in Table 1 and Table 2.

TABLE 1

Analysis of liquid seasoning (pH, direct sugar, salt, enzyme activity)

|  | Comparison block 1 | Test block 1 |
| --- | --- | --- |
| pH | 4.7 | 4.6 |
| Direct sugar | 29% | 30% |
| Salt | 13.0% | 13.8% |
| Enzyme activity (Unit/g) | 52 | 55 |

TABLE 2

Analysis of liquid seasoning (Sensory evaluation)

| | | Comparison block 1 | Test block 1 |
| --- | --- | --- | --- |
| Sensory evaluation | Odor | 2.0 | 3.2 |
| | Taste | 3.0 | 3.0 |
| | Sensory findings | White pasty form Koji smell was felt slightly | Gold-colored liquid Less koji smell was felt than comparison block 1 |

Example 2

Method for Producing Liquid Seasoning (without Enzyme Activity (Protease Activity))

(1) Production of Liquid Seasoning Having No Enzyme Activity

A preparation liquid was obtained by mixing 50 kg of malted rice obtained in the above-described example 1 (1), 13 kg of salt (crude salt), and 37 L of water. The preparation liquid was subjected to fermentation and maturation for 10 days at 30° C., and the matured product was obtained. The matured product obtained was filled and packed in a heat resistant bag and was kept in warm water at 85° C. for 15 minutes, and a heated matured product was obtained (comparison block 2). The heated matured product obtained was subjected to compression filtration using a compression filtration apparatus (pressure-filtration compression apparatus used for laboratory, produced by NSK Engineering Co., Ltd.), and the filtrate was obtained as a liquid seasoning (test block 2).

(2) Analysis of Liquid Seasoning

Measurements of pH, direct sugar, salt and enzyme activity were performed by a method similar to the method used in Example 1 (3), and a sensory evaluation was carried out for the heated matured product obtained (comparison block 2) and the liquid seasoning (test block 2).

Results are shown in Table 3 and Table 4.

TABLE 3

Analysis of liquid seasoning (without enzyme activity) (measurement of pH, direct sugar, salt and enzyme activity)

|  | Comparison block 2 | Test block 2 |
| --- | --- | --- |
| pH | 4.7 | 4.6 |
| Direct sugar | 27% | 29% |
| Salt content | 12.9% | 13.8% |
| Enzyme activity (Unit/g) | 0 | 0 |

TABLE 4

Analysis of the liquid seasoning (having no enzyme activity) (Sensory evaluation)

|  |  | Comparison block 2 | Test block 2 |
|---|---|---|---|
| Sensory evaluation | Odor | 1.4 | 2.0 |
|  | Taste | 2.2 | 2.5 |
|  | Sensory findings | White pasty form Koji smell was felt strongly. Smell produced by heating and stuffy smell were felt slightly Bitter taste was felt in umami, sweetness and saltiness Unpleasant taste was felt | Gold-colored liquid. Less koji smell was felt than comparison block 2 Smell produced by heating and stuffy smell were felt slightly Bitter taste was felt slightly in umami, sweetness and saltiness Unpleasant taste was felt slightly |

Example 3

Comparison Between Liquid Seasoning and Salted Rice Malt (Shiokoji)

(1) Cooking of Meat-1

Food material (breast meat of chicken) was cooked using the liquid seasonings (respectively served as test block 1: enzyme activity 55 (unit/g), and test block 2: enzyme activity 0 (unit/g)) obtained in the above-described Example 1 and Example 2 and the matured product obtained in Example 1 (comparison block 1: enzyme activity 52 (unit/g)) before the compression filtration treatment, and then the evaluation with respect to the seasonings was carried out. Specifically, 100 g of breast meat of chicken was immersed in 8 mL (corresponding to 10 g weight) of the liquid seasoning (test block 1 or test block 2) or 10 g of matured product at 5° C. for 12 hours, and the resultant meat was grilled. Then, the sensory evaluation was carried out with respect to the cooked food.

The sensory evaluation was carried out by 5 trained, specialized panelists. Items of "taste" and "softness" of the meats were evaluated as described below and the average values are shown.

(Sensory Evaluation Criteria)

The "taste" of meat was represented by a degree of strength, and was evaluated using the following evaluation criteria.

5: Strong.
4: Slightly strong.
3: Normal.
2: Slightly weak.
1: Weak.

The "softness" of meat was represented by a degree of strength, and was evaluated using the following evaluation criteria.

5: Soft.
4: Slightly soft.
3: Normal.
2: Slightly hard.
1: Hard.

Results are shown in Table 5.

TABLE 5

|  |  | Sensory evaluation | | |
|---|---|---|---|---|
|  |  | Test block 1 | Test block 2 | Comparison block 1 |
| Enzyme activity (unit/g) |  | 55 | 0 | 52 |
| Sensory evaluation | Taste | 4.2 | 3.0 | 3.6 |
|  | Softness | 4.4 | 2.2 | 3.8 |

(2) Cooking of Meat-2

Food materials (leg meat of chicken and pork loin) were cooked by using the liquid seasoning (test block 1) obtained in the above-described example 1 and using salted rice malt (Siokouji, obtained from Hanamaruki Foods Inc.), and the evaluation with respect to the seasonings was carried out. Specifically, 10 weight % each of the liquid seasoning and the salted rice malt relative to the weight of the meat were applied to the leg meat of chicken and pork loin, the resultant materials were kept in this way at 5° C. for 24 hours, and then grilled. The sensory findings are shown for the cooked foods.

The results showed that both the leg meat of chicken and pork loin cooked using the liquid seasonings were softer than those cooked using the salted rice malt. In addition, the pork loin cooked using the liquid seasonings had less smell of uncooked meat than that of the pork loin cooked using the salted rice malt.

(3) Cooking of Fish

Food material (slice of fresh salmon) was cooked by using the liquid seasoning (test block 1) obtained in the above-described example 1 and using the salted rice malt (Siokouji, obtained from Hanamaruki Foods Inc.), and then an evaluation with respect to the seasonings was carried out. Specifically, 10 weight % each of the liquid seasoning and the salted rice malt relative to the weight of the slice were applied to the surface of slice of fresh salmon, the resultant material was kept in this way at 5° C. for 24 hours, and then grilled. The, sensory findings are shown for the cooked food.

The results showed that the taste was infiltrated only to the surface, in the slice cooked using the salted rice malt. In contrast, the taste was infiltrated into the center, in the slice cooked using the liquid seasoning and good gloss was also obtained for the grilled food.

(4) Cooking of Vegetable

Food material (green soybeans) was cooked by using the liquid seasoning (test block 1) obtained in the above-described Example 1 and using the salted rice malt (Shiokouji, obtained from Hanamaruki Foods Inc.), and then an evaluation with respect to the seasonings was carried out. Specifically, 6 weight % each of the liquid seasoning and the salted rice malt relative to the boiling water for the green soybeans, were stirred in the water, and the raw green soybeans were boiled for 5 minutes. The sensory findings are shown for the cooked foods.

The results showed that the green soybeans cooked using the salted rice malt had unsatisfactory taste and had pods on which koji grains were attached so as to spoil the appearance. In contrast, in the green soybeans cooked using the liquid seasoning, the taste was infiltrated into the center, and sweetness of the food material was brought out for a rich taste.

(5) Preparation of Carpaccio

A marinade was prepared by using the liquid seasoning (test block 1) obtained in the above-described Example 1 and using the salted rice malt (Shiokouji, obtained from Hanamaruki Foods Inc.), and then an evaluation with respect to the seasonings was carried out. Specifically, the liquid seasoning or the salted rice malt and olive oil were mixed to prepare the marinade using the ratio (liquid seasoning or salted rice malt:olive oil=1:3). Thin slices of white flesh (red sea bream) were soaked in the prepared marinade at 5° C. for 1 hour and the two kinds of carpaccio were prepared. Then, sensory findings are shown for respective carpaccio.

The results showed that the slice of white flesh prepared using the liquid seasoning was softer than the slice prepared using the salted rice malt, and the smell specific to fish was eliminated.

(6) Baking of Bread

Bread was baked by using the liquid seasoning (test block 1) obtained in the above-described Example 1 and using the salted rice malt (Shiokouji, obtained from Hanamaruki Foods Inc.). Specifically, 40 mL of the liquid seasoning or 38 g of the salted rice malt was added to 280 g of strong flour, 20 g of sugar, 150 mL of water, 20 g of olive oil, 6 g of skimmed milk and 3 g of dry yeast, and loaves of bread were baked by a usual method. The sensory findings are shown for each of the loaves.

The results showed that the bread baked using the liquid seasoning was moist and very tasty.

Example 4

Comparison Between the Liquid Seasoning and Other Seasonings (Sweet Sake (Mirin), and Soy Source Made from Rice (kome-shoyu))

A comparison was performed between the liquid seasoning (test block 1) obtained in the above-described Example 1 and other seasonings (mirin and kome-shoyu) whose main raw material was rice, in terms of components of seasonings. Specifically, raw material, salt, direct sugar, alcoholic content, and enzyme activity were measured as the components. The salt measurement, the direct sugar measurement, and the enzyme activity measurement were performed by methods similar to those used in Example 1 (3).

Alcohol measurement was performed by a gas chromatography method. Specifically, the measurement was performed by GC-8A equipped with an FID detector (produced by Shimadzu Corporation) using a stainless-steel column (1.0 m length×3 mm inner diameter) filled with filler (Porapak™ QS, produced by Nihon Waters K.K.).

Here, hon-mirin (obtained from Kikkoman Corporation) was used as the sweet sake. Kome-shoyu (obtained from Ohtaka Shoyu Co., Ltd.) was used as the soy source made from rice.

In addition, sensory findings are shown for respective seasonings.

Results are shown in Table 6.

TABLE 6

Components of the liquid seasoning, sweet sake (mirin) and soy sauce made from rice (kome-shoyu)

| | Liquid seasoning (Test block 1) | Sweet sake | Soy sauce made from rice |
|---|---|---|---|
| | Raw materials | | |
| | Malted rice and salt | Glutinous rice, rice, malted rice, brewing alcohol, and saccharides | Rice and salt |
| Salt | 13.8% | 0% | 8.6% |
| Direct sugar | 30.0% | 34.1% | 8.3% |
| Alcohol content | 0% | 8.5% | 0.4% |
| Enzyme activity | 55 | 0 | 0 |
| Sensory findings | Gold-colored Liquid. Good balance among umami, sweetness and saltiness. Koji smell was felt slightly among these three samples. | Gold-colored Liquid. The lightest color among these three samples. Sweetness is strongest among the three samples. Umami was felt, but saltiness was not felt. | Gold-colored Liquid. The darkest color among these three samples. Umami and saltiness were felt but sweetness was felt weak. |

Example 5

Study of Preparation Liquid (1) Indicator for Fermentation and Maturation

A preparation liquid was obtained by mixing 50 kg of malted rice obtained in the above-described Example 1 (1), 13 kg of salt (crude salt) and 37 L of water. The preparation liquid was subjected to fermentation and maturation for 21 days at 30° C. and a matured product was obtained. On the 1st day, 2nd day, 3rd day, 4th day, 7th day, 10th day, 16th day, and 21st day of the fermentation and maturation, aliquots of the matured product were sampled and the Brix and pH of each of the aliquots were measured. In addition, the direct sugar was measured on the 1st day and 10th day. Further, the sugar composition was analyzed on the 10th day.

The pH measurement and the direct sugar measurement were performed by the methods similar to those of Example 1 (3).

The Brix measurement was performed by the following method. The matured product weighing 10 g and 10 mL of distilled water were mixed sufficiently, the mixture was left to stand for 5 minutes, and then filtered using a filter paper (ADVANTEC 5B). A handy refractometer (HSR-500, produced by ATAGO) was used to measure the Brix of the filtrate. Adjustment was made on the dilution ratio (a factor of 2) and the value of Brix (%) of the matured product was obtained.

The analysis of sugar composition was performed by a high performance liquid chromatography (HPLC) method.

Figure 2:
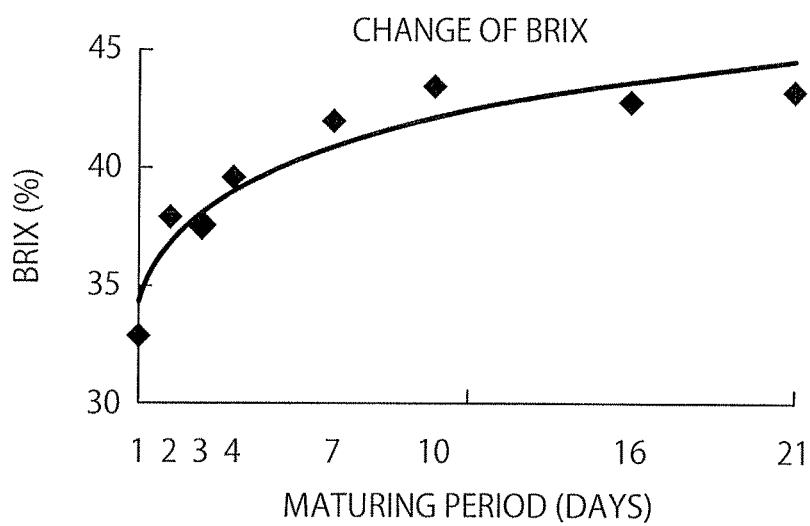
FIG. 2 illustrates an example of a graph showing the change of Brix of the preparation liquid during fermentation and maturation.
Figure 3:
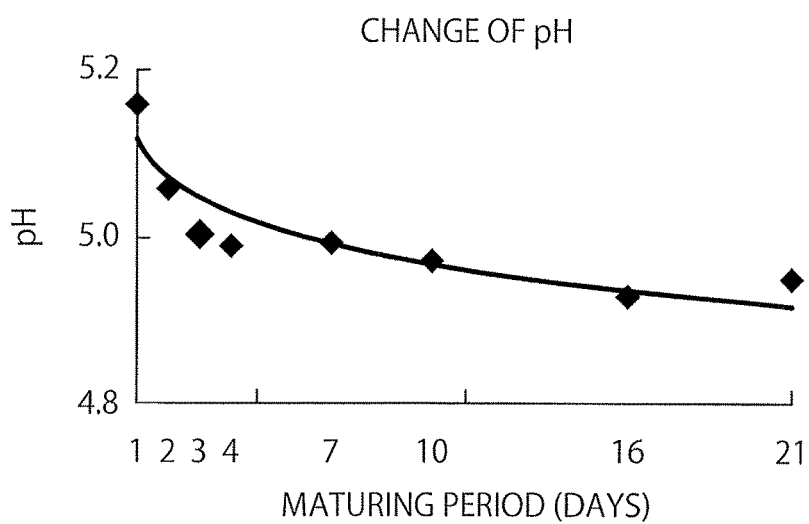
FIG. 3 illustrates an example of a graph showing the change of pH of the preparation liquid during the fermentation and maturation.

Results are shown in FIGS. 2 and 3, and Table 7.

TABLE 7

| Fermentation and maturation index | | | |
|---|---|---|---|
| Fermentation and maturation duration | Brix (%) | pH | Direct sugar (%) |
| Day 1 | 33.0 | 5.16 | 8 |
| Day 2 | 38.0 | 5.06 | — |
| Day 3 | 37.6 | 5.00 | — |
| Day 4 | 39.6 | 4.99 | — |
| Day 7 | 42.0 | 4.99 | — |
| Day 10 | 43.4 | 4.97 | 30 |
| Day 16 | 42.8 | 4.93 | — |
| Day 21 | 43.2 | 4.95 | — |

Remarks: — : not tested

The results of the analysis of sugar composition on the 10th day showed 27.8% of glucose, 0.66% of maltose, and 1.11% of isomaltose.

(2) Conditions of Fermentation and Maturation

A preparation liquid was obtained by mixing 50 kg of malted rice obtained in the above-described Example 1 (1), 13 kg of salt (crude salt) and 37 L of water. The preparation liquid was subjected to fermentation and maturation at a high temperature (55° C.) for 10 days and a matured product was obtained (comparison block 3). When the temperature of the fermentation and maturation is high, saccharification proceeds rapidly, which makes it possible to shorten the period of fermentation and maturation. Hence, a matured product (comparison block 4) was obtained by changing the period of fermentation and maturation to 1 day while maintaining the other conditions similar to those of the comparison block 3. The enzyme activity of the matured product obtained was measured by a method similar to the method of Example 1 (3).

The results showed that the enzyme activity of comparison block 3 and the enzyme activity of comparison block 4 each were 0 (unit/g).

The invention claimed is:

1. A liquid seasoning whose main raw material is rice obtained by carrying out a solid-liquid separation after performing fermentation and maturation at a low temperature of a preparation liquid prepared by mixing malted rice, salt and water,
wherein the liquid seasoning is not soy sauce.

2. The liquid seasoning according to claim 1, wherein the low temperature is 4° C. to 40° C.

3. The liquid seasoning according to claim 1, wherein the fermentation and maturation are performed until the Brix value increases by 4% or more relative to the Brix value in the first day of the fermentation and maturation.

4. The liquid seasoning according to claim 1, wherein the fermentation and maturation are performed until the concentration of direct sugar increases by 8% or more relative to the concentration of direct sugar in the first day of the fermentation and maturation.

5. The liquid seasoning according to claim 1, wherein a period of the fermentation and maturation is 1 to 60 days.

6. The liquid seasoning according to claim 1, having enzyme activity.

7. The liquid seasoning according to claim 1, having protease activity.

8. A method for producing a liquid seasoning whose main raw material is rice, wherein the liquid seasoning is not soy sauce, comprising:
performing fermentation and maturation at a low temperature of a preparation liquid prepared by mixing malted rice, salt and water; and then
carrying out a solid-liquid separation.

9. The method for producing the liquid seasoning according to claim 8, wherein the low temperature is 4° C. to 40° C.

10. A food and drink prepared by adding the liquid seasoning according to claim 1.

* * * * *